(12) United States Patent
Dalsgaard et al.

(10) Patent No.: US 10,687,237 B2
(45) Date of Patent: Jun. 16, 2020

(54) MEASUREMENT REPORTS FOR THE EVALUATION OF CELL CANDIDATE(S)

(71) Applicant: Nokia Solutions and Networks Oy, Espoo (FI)

(72) Inventors: Lars Dalsgaard, Oulu (FI); Elena Virtej, Espoo (FI); Jari Petteri Lunden, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 66 days.

(21) Appl. No.: 15/759,889

(22) PCT Filed: Oct. 9, 2015

(86) PCT No.: PCT/EP2015/073344
§ 371 (c)(1),
(2) Date: Mar. 14, 2018

(87) PCT Pub. No.: WO2017/059920
PCT Pub. Date: Apr. 13, 2017

(65) Prior Publication Data
US 2018/0270687 A1    Sep. 20, 2018

(51) Int. Cl.
*H04W 24/10* (2009.01)
*H04W 72/08* (2009.01)
*H04L 5/00* (2006.01)

(52) U.S. Cl.
CPC ............. *H04W 24/10* (2013.01); *H04L 5/001* (2013.01); *H04W 72/085* (2013.01)

(58) Field of Classification Search
CPC ...... H04W 24/10; H04W 72/085; H04L 5/001
See application file for complete search history.

(56) References Cited

U.S. PATENT DOCUMENTS

2013/0208601 A1    8/2013   Cui et al.
2013/0336156 A1*   12/2013  Wei .................. H04L 5/001
                                                   370/252

(Continued)

FOREIGN PATENT DOCUMENTS

WO    2012/116489 A1    9/2012
WO    2014/133551 A1    9/2014

OTHER PUBLICATIONS

"3rd Generation Partnership Project; Technical Specification Group Radio Access Network; Evolved Universal Terrestrial Radio Access (E-UTRA); Requirements for support of radio resource management (Release 13)", 3GPP TS 36.133, V13.0.0, Jul. 2015, pp. 1-1412.

(Continued)

*Primary Examiner* — Jackie Zuniga Abad
(74) *Attorney, Agent, or Firm* — Harrington & Smith

(57) ABSTRACT

There is provided a method comprising: determining, by a network element in communication with a terminal device, to initiate allocation of radio resources to the terminal device from at least one further carrier; as a response to the determining, requesting, from the terminal device, a measurement report for determining at least one cell for providing said radio resources from the at least one further carrier; as a response to the requesting, acquiring the measurement report from the terminal device; determining whether the measurement report indicates one or more cell candidates for providing said radio resources; and as a response to the determining that the measurement report indicates the one or more cell candidates, determining the at least one cell among the one or more cell candidates for providing said radio resources to the terminal device from the at least one further carrier.

21 Claims, 7 Drawing Sheets

210 DETERMINING, BY A NETWORK ELEMENT, TO INITIATE ALLOCATION OF RADIO RESOURCES TO A TERMINAL DEVICE FROM AT LEAST ONE FURTHER CARRIER

220 REQUESTING A MEASUREMENT REPORT FOR DETERMINING AT LEAST ONE CELL FOR PROVIDING SAID RADIO RESOURCES TO THE TERMINAL DEVICE FROM THE AT LEAST ONE FURTHER CARRIER

230 ACQUIRING THE MEASUREMENT REPORT FROM THE TERMINAL DEVICE

240 DETERMINING WHETHER THE MEASUREMENT REPORT INDICATES ONE OR MORE CELL CANDIDATES FOR PROVIDING SAID RADIO RESOURCES TO THE TERMINAL DEVICE FROM THE AT LEAST ONE FURTHER CARRIER

250 AS RESPONSE TO THE DETERMINING THAT THE MEASUREMENT REPORT INDICATES THE ONE OR MORE CELL CANDIDATES, DETERMINING THE AT LEAST ONE CELL AMONG THE ONE OR MORE CELL CANDIDATES

(56) References Cited

U.S. PATENT DOCUMENTS

2015/0087316 A1    3/2015  Bostrom et al.
2015/0156636 A1    6/2015  Tabet et al.
2015/0382221 A1* 12/2015  Dalsgaard ............. H04W 24/10
                                                                  370/252

OTHER PUBLICATIONS

International Search Report and Written Opinion for corresponding Patent Cooperation Treaty Application No. PCT/EP2015/073344, dated Jul. 5, 2016, 13 pages.

* cited by examiner

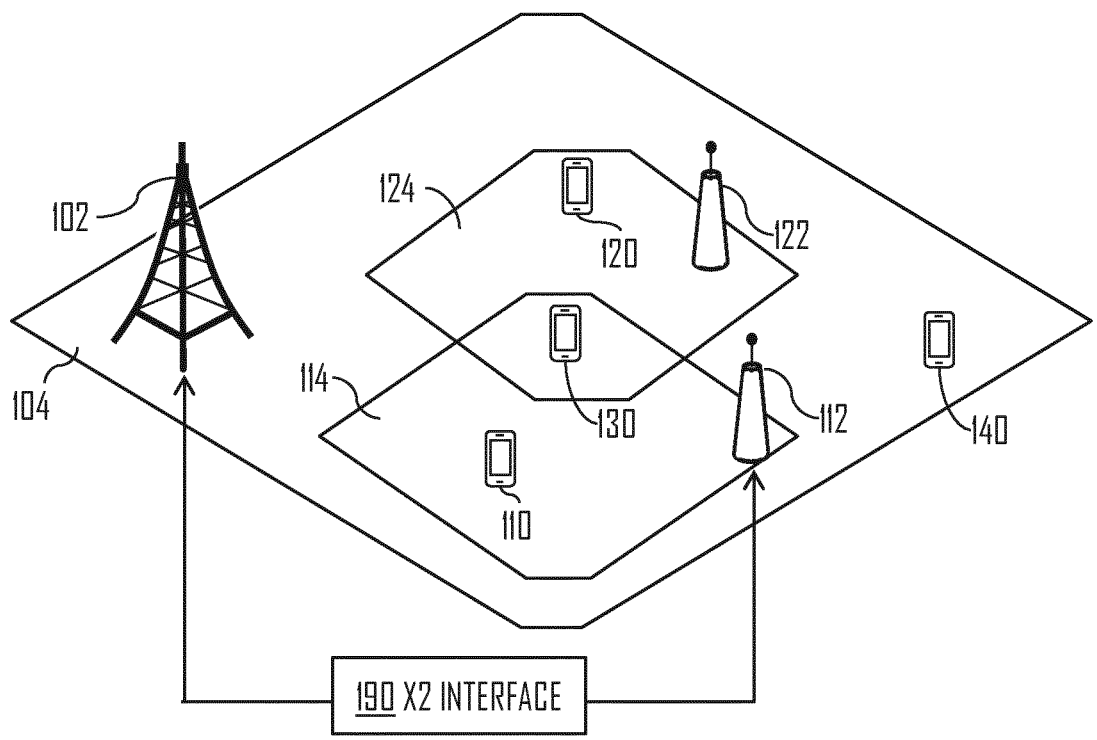

Fig. 1

210 DETERMINING, BY A NETWORK ELEMENT, TO INITIATE ALLOCATION OF RADIO RESOURCES TO A TERMINAL DEVICE FROM AT LEAST ONE FURTHER CARRIER

220 REQUESTING A MEASUREMENT REPORT FOR DETERMINING AT LEAST ONE CELL FOR PROVIDING SAID RADIO RESOURCES TO THE TERMINAL DEVICE FROM THE AT LEAST ONE FURTHER CARRIER

230 ACQUIRING THE MEASUREMENT REPORT FROM THE TERMINAL DEVICE

240 DETERMINING WHETHER THE MEASUREMENT REPORT INDICATES ONE OR MORE CELL CANDIDATES FOR PROVIDING SAID RADIO RESOURCES TO THE TERMINAL DEVICE FROM THE AT LEAST ONE FURTHER CARRIER

250 AS RESPONSE TO THE DETERMINING THAT THE MEASUREMENT REPORT INDICATES THE ONE OR MORE CELL CANDIDATES, DETERMINING THE AT LEAST ONE CELL AMONG THE ONE OR MORE CELL CANDIDATES

Fig. 2

310 PERFORMING, BY A TERMINAL DEVICE IN COMMUNICATION WITH A NETWORK ELEMENT, AT LEAST ONE MEASUREMENT ON AT LEAST ONE FURTHER CARRIER TO DETERMINE ONE OR MORE CELL CANDIDATES FOR PROVIDING RADIO RESOURCES TO THE TERMINAL DEVICE FROM THE AT LEAST ONE FURTHER CARRIER

320 RECEIVING A MEASUREMENT REPORT REQUEST FROM THE NETWORK ELEMENT

330 GENERATING THE MEASUREMENT REPORT SUCH THAT IT COMPRISES INDICATION OF DETERMINED ONE OR MORE CELL CANDIDATES FOR PROVIDING SAID RADIO RESOURCES FROM THE AT LEAST ONE FURTHER CARRIER

340 TRANSMITTING THE MEASUREMENT REPORT TO THE NETWORK ELEMENT AS A RESPONSE TO THE MEASUREMENT REPORT REQUEST

Fig. 3

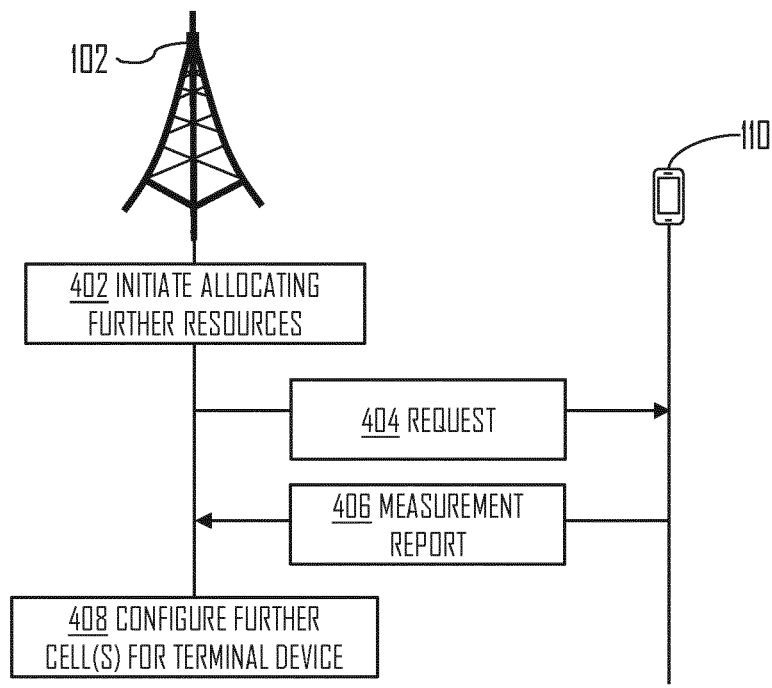

Fig. 4A

MEASUREMENT REPORTS FOR THE EVALUATION OF CELL CANDIDATE(S)

RELATED APPLICATION

This application was originally filed as Patent Cooperation Treaty Application No. PCT/EP2015/073344 filed Oct. 9, 2015.

TECHNICAL FIELD

The invention relates to communications.

BACKGROUND

In a communication network, data may be transferred between network elements and terminal devices. It may be beneficial to provide solutions enhancing use of radio resources from one or more carriers.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates an example a radio system to which embodiments of the invention may be applied;

FIG. 2 illustrates a flow diagram according to an embodiment of the invention;

FIG. 3 illustrates a flow diagram according to an embodiment of the invention;

FIGS. 4A to 4C illustrate some embodiments.

DETAILED DESCRIPTION OF SOME EMBODIMENTS

Figure 4B:
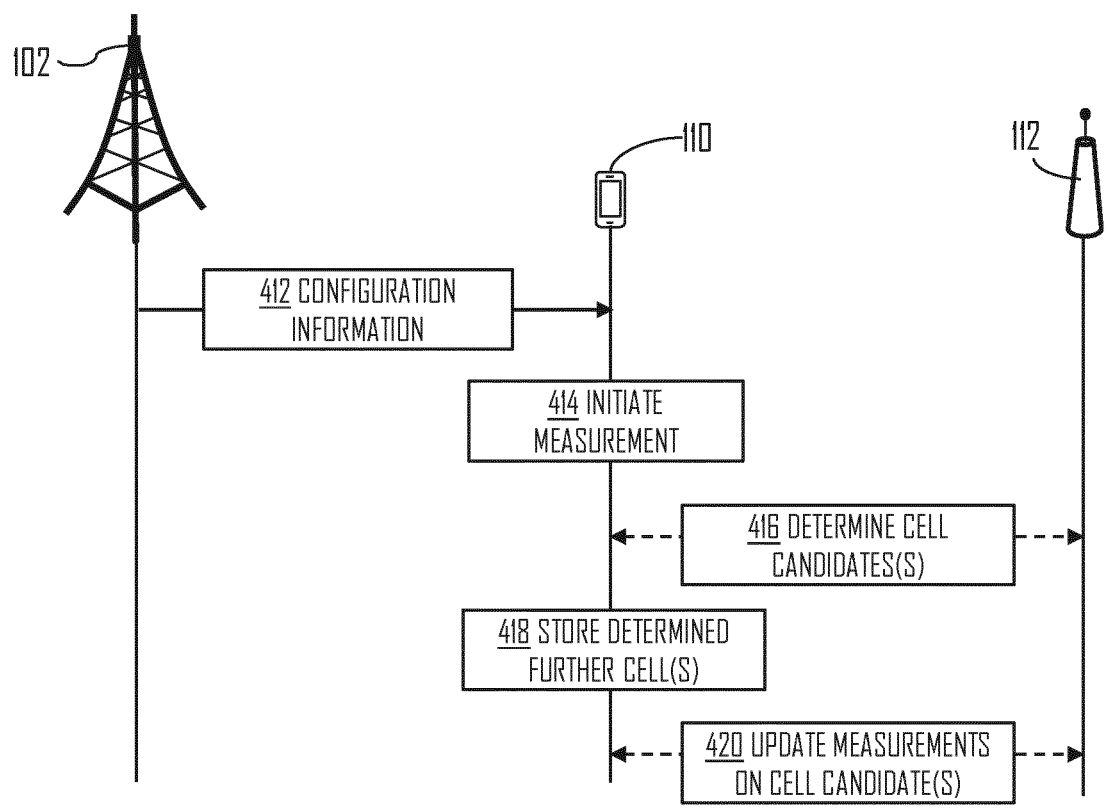

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced.

The embodiments are not, however, restricted to the system given as an example but a person skilled in the art may apply the solution to other communication systems provided with necessary properties. Another example of a suitable communications system is the 5G concept. 5G is likely to use multiple input-multiple output (MIMO) techniques, many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. In addition, the system may be based on small cell technology and on efficient small cell offloading in future networks, meeting the 1000 fold increase in data requirements. Use of small cells for offloading either by use of improved procedures based on existing methods like Carrier Aggregation (CA) and/or Dual Connectivity (DC) may be part of baseline 5G design.

FIG. 1 illustrates example of a radio system (also referred to as a cellular communication system) to which embodiments of the invention may be applied. Radio communication networks (also referred to as cellular communication networks), such as the Long Term Evolution (LTE), the LTE-Advanced (LTE-A) of the 3$^{rd}$ Generation Partnership Project (3GPP), or the predicted future 5G solutions, are typically composed of at least one network element, such as a network element 102, providing a cell 104. In the example of FIG. 1, cells 104, 114, 124 may be shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124.

Each cell of the radio communication network may be, e.g., a macro cell, a micro cell, a femto, or a pico-cell, for example. Each of the network elements of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. For 5G solutions, the implementation may be similar to LTE-A, as described above. The network elements 102, 112, 124 may be base station(s) or a small base station(s), for example. In the case of multiple eNBs in the communication network, the eNBs may be connected to each other with an X2 interface 190 as specified in the LTE. Example of this may be shown in FIG. 1, wherein the network element 112 may be shown to be connected to the network element 102 via the X2 interface 190. Other communication methods between the network elements may also be possible. At least some of the network elements 102, 112, 122 may be further connected via an S1 interface to an evolved packet core, more specifically to a mobility management entity (MME) and to a system architecture evolution gateway (SAE-GW).

The cells 114, 124 may be referred also to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example.

In an embodiment, the local area access nodes are network elements similar to the network element 102. Thus, for example, the local area access node 112 may be an eNB or a macro eNB.

The cells 104, 114, 124 may provide service for at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service. For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. To further explain the scenario, the cells 114, 124 may be at least partially within the cell 104.

In an embodiment, the at least one terminal device 110, 120, 130, 140 is able to communicate with other similar devices via the network element 102. The other devices may be within the cell 104 and/or may be within other cells provided by other network elements. The at least one terminal device 110, 120, 130, 140 may be stationary or on the move. In an embodiment, the at least one terminal device 110, 120, 130, 140 may communicate directly with other terminal devices using, for example, Device-to-Device (D2D) communication.

The radio system may support Carrier Aggregation (CA). CA may enable increasing usable bandwidth between the terminal devices and network elements of the radio system. For example, in the 3GPP, CA may be used for LTE-A in order to support wider transmission bandwidths enhancing increased potential peak data rates to meet LTE-A requirements. For example, more than one component carriers may be aggregated contiguously and/or non-contiguously to provide a wider bandwidth. In uplink carrier aggregation, multiple uplink component carriers may be aggregated and can be allocated in a subframe to a terminal device. Further, the radio system may support intra-band CA with contiguous and/or non-contiguous resource allocation. The radio system may also support inter-band CA enabling non-contiguous resource allocation from more than one radio band.

The radio system may support Dual Connectivity (DC). This may be enabled by the network element 102 and the second network element, for example. Naturally, in order to use DC, the at least one terminal device 110, 120, 130, 140 may also need to support DC. The DC may be a radio system feature, wherein the at least one terminal device 110, 120, 130, 140 may simultaneously receive and/or may simultaneously transmit to at least two network points. Similarly, the radio system of FIG. 1 may support Multiple-Input and Multiple-Output (MIMO). Thus, the network elements and/or the terminal devices of the radio system may comprise more than one antenna for data transfer. Currently CA may cover up to aggregation of 5 component carriers while DC in Rel-12 covers dual connectivity between Primary Cell (PCell) and Primary Secondary Cell (PSCell) excluding Secondary Cells (SCells). In Rel-13 work is ongoing defining DC including also having SCell in combination with PCell and/or PSCell. Additionally work in CA making it possible on longer terms to aggregate up 32 component carriers (CCs)—i.e. 32 Component Carrier (CC) CA, which may be called enhanced Carrier Aggregation (eCA). One example case is e.g. going towards 32 CC CA and additionally also DC with increased amount of CCs per Cell Group (CG)—MCG and/or CSG e.g. 32 CA CC may be simply to enhance currently applied configuration and control methods. This would mean that each SCell would need to be configured by the network using RRM message followed by an activation command prior to enabling terminal device (UE) scheduling on the SCell. Network may take two approaches when configuring a SCell:

a) known SCell: in this case the network may receive a measurement report from a terminal device including measurements on the SCell. Based on the reporting the network may configure the SCell to the terminal device—later followed by an activation command.

b) Unknown SCell: in this case the network either may have not received a measurement report including the SCell (the network relies on deployment knowledge), or the network may have received measurement report including the SCell but the measurement report may have been received over a certain time ago. In this case the network may configure the SCell followed by an activation MAC control element.

It may be possible that the radio system shown in FIG. 1 supports Licensed-Assisted Access (LAA) which relates to using unlicensed radio band(s) for data transfer. The cell(s) providing service in the unlicensed band(s) may be referred to as unlicensed cells. For example, the network element 102 and/or the second network element may provide one or more unlicensed cells in order to increase data transfer capability on the radio system. For example, the network element 102 may allocate radio resources of the one or more unlicensed cell for the at least one terminal device 110, 120, 130, 140 through CA, thus increasing the data transfer between the at least one terminal device 110, 120, 130, 140 and the network element(s).

It may also be possible that the radio system of FIG. 1 supports Machine Type Communication (MTC). MTC may enable providing service for a large amount of MTC capable devices. Such communication may increase the load of the radio communication network.

The at least one terminal device 110, 120, 130, 140 may comprise mobile phones, smart phones, tablet computers, laptops and other devices used for user communication with the radio communication network. These devices may provide further functionality compared to the MTC schema, such as communication link for voice, video and/or data transfer. However, it needs to be understood that the at least one terminal device 110, 120, 130, 140 may also comprise MTC capable devices, such as sensor devices providing position, acceleration and/or temperature information to name a few examples. That said the radio communication network of FIG. 1 may comprise different types of devices (e.g. phones, laptops, tablets, MTC devices) and communication methods (e.g. CA, DC). The amount of devices and data transfer requirements may increase burden of the radio communication network. The Internet of Things (IoT) may even further increase the amount of devices within the radio communication network.

In the case the load of the radio system increases (e.g. due to increased amount of devices), sub-cells, such as small cells, may be used for offloading. The offloading method may vary depending on the capabilities of the terminal devices. One basic solution is to handover (HO) a terminal device, by the network element 102, to a sub-cell when needed. The CA feature may enable a Primary Cell (PCell) to use Secondary Cell (SCell) and/or Primary Secondary Cell (PSCell) for increased data transmission capability. For example, DL and/or UL data may be transmitted on the SCell and/or the PSCell depending on the capability of the terminal device. In other words, introduction of the CA feature made it possible to use the small cells for improved downlink (DL) data (also uplink (UL) data on PCell) which was followed up by introduction of DC and PUCCH SCell which may also enable UL on the secondary cell.

Common to these features is that they may all be under quite tight network control in terms of configuration and activation. In order to help the network make correct decision concerning configuring the terminal devices, the terminal devices transmit measurement reports to the network (e.g. to the network element 102) allowing the network to get knowledge about which sub-cells are in the vicinity of a particular terminal device. As the number of sub-cells, and potentially also amount of layers on which the sub-cells could be available, increases, the signaling burden caused by the tight network control of the cells may become significant. In case of a large amount of Component Carriers (CCs), this control signaling may in some cases end up being a significant part of the data exchange between a terminal device and the network element 102. Secondly, tight control and related control signaling may add delays in enabling the network to effectively use the resources on available cells for scheduling the terminal devices.

There is provided a solution to enhance the transmitting of the measurement reports. The proposed solution may enhance the balance between tight network control and network flexibility by decreasing the amount of control signaling needed between the network element and a terminal device.

The proposed solution is related to introducing an instant terminal device assisted network controlled SCell activation method. The method may enable the network to control the activation of a SCell on a given carrier(s) without the need for continuous measurement reporting by the terminal device. Upon reception of a request or a command—e.g. the activation command from the network, the terminal device may reply to the network with a report which includes (SCell) candidate cells from the activated CCs (i.e. the given carrier(s)). This may mean that an activation command received from the network would be regarded as a generic activation command for the configured CCs without activating any specific cell(s), such as SCell. Based in receiving the request or command (e.g. activation command) from the network, the terminal device may deliver a report (e.g. measurement report or similar) to the network, based on which the network may pick the most suitable cell(s) to be used as SCell. The network may hereafter configure the terminal device with the given SCell configuration. FIG. 2 illustrates a flow diagram of an embodiment of the invention. Referring to FIG. 2, a network element in communication with a terminal device, may determine to initiate allocation of radio resources to the terminal device from at least one further carrier (step 210). As a response to the determining, the network element 102 may request, from the terminal device, a measurement report for determining at least one cell for providing said radio resources to the terminal device from the at least one further carrier (step 220). As a response to the requesting, the network element may acquire the measurement report from the terminal device (step 230). The network element may determine whether the measurement report indicates one or more cell candidates for providing said radio resources to the terminal device from the at least one further carrier (step 240). As a response to the determining that the measurement report indicates the one or more cell candidates, determining the at least one cell among the one or more cell candidates for providing said radio resources to the terminal device from the at least one further carrier (step 250).

The network element performing the steps 210 to 250 of FIG. 2 may be and/or be comprised in network element 102, for example. Further, an apparatus (e.g. circuitry) integrated with a network element may perform the steps of FIG. 2. The terminal device related to FIG. 2 may be and/or be comprised in the at least one terminal device 110, 120, 130, 140.

FIG. 3 illustrates a flow diagram of an embodiment of the invention. Referring to FIG. 3, a terminal device in communication with a network element may perform at least one measurement on at least one further carrier to determine one or more cell candidates for providing radio resources to the terminal device from the at least one further carrier (step 310). The terminal device may receive a measurement report request from the network element (step 320). The terminal device may generate a measurement report such that it comprises indication of determined one or more cell candidates for providing said radio resources from the at least one further carrier (step 330). The terminal device may transmit the measurement report to the network element as a response to the measurement report request (step 340).

The terminal device performing the steps 310 to 340 of FIG. 3 may be and/or be comprised in the at least one terminal device 110, 120, 130, 140, for example. Further, an apparatus (e.g. circuitry) integrated with a terminal device may perform the steps of FIG. 3. The network element related to FIG. 3 may be and/or be comprised in the network element 102, for example.

It needs to be understood that the measurement report request (transmitted in step 230) may be referred to simply as a request for determining the at least one cell for providing said radio resources to the terminal device from the at least one further carrier. Similarly, the measurement report generated and/or transmitted as response to said request may be understood as a message comprising indication of determined one or more cell candidates for providing said radio resources from the at least one further carrier. That is, the network element 102 may request indication of the determined cell(s), and the terminal device 110 may respond with the message comprising the indication of the determined cells.

Let us now look closer on some embodiments. FIG. 4A illustrates an embodiment. Referring to FIG. 4A, the network element 102 may be in communication with the terminal device 110. This may mean, for example, that at least some configuration information is transferred between the two. In one example, the network element 102 may have configured and/or may configure radio resources from a carrier to the terminal device 110, wherein the radio resources on said carrier are provided by the network element 102 via cell 104. Thus, for example, the network element 102 may provide (i.e. allocate) uplink (UL) and/or downlink (DL) radio resources for the terminal device 110 via the cell 104.

The network element 102 may determine to initiate allocating further radio resources on at least one further carrier (step 402). For example, the network element 102 may determine an increased amount of traffic and decide to start allocation of further radio resources from further carrier(s). This may mean that the carrier used to initially provide radio resources to the terminal device 110 may be determined to be too occupied to provide sufficient service level for the terminal device 110. Also, it may be that the network element 102 determines that the terminal device 110 needs further DL and/or UL radio resources. For example, the terminal device 110 may indicate to the network element 102 that it needs further radio resources. The network element 102 may determine that such further radio resources are not available on the initial carrier, and thus it may initiate the allocation of further radio resources on the at least one further carrier.

For example, the network element 102 may have allocated radio resources to the terminal device 110 via a first CC. In step 402, the network element 102 may determine to configure and/or activate at least one further CC for the terminal device 110. However, in order to do this efficiently, the network element 102 may require a measurement report from the terminal device 110, the measurement report indicating cell candidate(s) for providing the at least one further CC. In sake of simplicity, let us simply refer to carriers which may comprise CCs used in CA.

After determining to initiate allocation of radio resources from the at least one further carrier to the terminal device 110, the network element may transmit the measurement report request to the terminal device (step 404). The measurement report request may also be referred to as an activation command. The measurement report request may be regarded as a generic activation command for a given carrier(s) without activating and/or requesting activation of any specific cell, such as a SCell or a PSCell. Therefore, the measurement report request may comprise an indication of the at least one further carrier (i.e. given carrier(s)). Thus, the terminal device 110, when receiving the measurement report request, may determine to which carrier(s) the measurement report request refers to and/or is related to. However, the measurement report request, as stated also above, may not activate a certain carrier or carriers (i.e. radio resources on the carrier(s)) to the terminal device 110.

The terminal device 110 may receive the measurement report request 404 directly from the network element 102 and/or via some other network element. For example, if DC is enabled, the measurement report request may be received via a local area access node, such as the local area access node 112.

The terminal device 110 may, as response to the receiving the measurement report request, generate the measurement report as in step 330 of FIG. 3. As described above, the measurement report request may request the terminal device 110 to indicate determined (e.g. detected) cell candidate(s) for providing the radio resources from the at least one further carrier, the at least one carrier being indicated in the measurement report request. However, it is possible that the terminal device 110 has not determined any cell candidate(s) for providing the radio resources from the at least one further carrier. Such may happen at least in two different scenarios.

Firstly, the terminal device 110 may not detect any cell candidate(s) for providing the radio resources from the at least one further carrier. There simply may not be any cell(s) which could provide the radio resources from the further carrier(s) indicated by the network element 102 in the area in which the terminal device 110 is located at. In other words, the terminal device 110 may be located at an area in which there is no coverage from possible cell candidate(s). One example of this may be shown in FIG. 5A, wherein a terminal device 120 may be within the cell 104 (providing the initial carrier). However, the terminal device 120 may not be within the coverage of the sub-cell 114, and thus the radio resources from the further carrier(s) may not be provided by the sub-cell 114 to the terminal device 120. It needs to be noted that it is possible that the radio resources from at least some of the further carrier(s) may be provided by the cell 104 to the terminal device 120.

Secondly, the terminal device 110 may detect cell candidate(s) which do not fulfil a given set threshold—e.g. a quality thresholds. The quality thresholds may be predetermined in the terminal device 110 and/or they may be received from the network, for example, from the network element 102. In an embodiment, the quality threshold(s) are comprised in the measurement report request. These quality threshold(s) may comprise threshold(s) for Signal to Noise Ratio (SNR), Signal to Interference and Noise Ratio (SINR), Reference Signal Received Power (RSRP), Reference Signal Received Quality (RSRQ), Received Signal Strength Indicator (RSSI). Thus, the terminal device 110 may detect a cell, but determine that said cell does not fulfil the quality threshold(s). Therefore, the terminal device 110 may determine that said is not a cell candidate for providing the radio resources on the at least one further carrier.

Further, it may also be possible that the terminal device 110 is within a cell that is not able to provide radio resources on said at least one further carrier. For example, a detected cell may be an unlicensed cell which may be unable to provide radio resources on licensed carrier(s).

Thus, as described above, the terminal device 110 may determine which detected cell(s) are cell candidates(s) for providing the radio resources from the at least one further carrier, and include indication of these determined cell candidate(s) to the measurement report. Therefore, the measurement report may comprise indication of no cells, if e.g.

no cells are detected and/or no detected cells fulfil configured quality threshold(s), or comprise indication of one or more detected cells and/or cell(s) that fulfil the quality threshold(s). In the case that no cells are detected and/or that the detected cell(s) do not fulfil the quality threshold(s), the measurement report may comprise an explicit indication that nothing is found, or that the terminal device 110 has not found good enough cell(s).

In step 406, the terminal device 110 may transmit the generated measurement report to the network element 102. The transmission may be directly to the network element 102 and/or via another network element (e.g. DC scenario). The transmission may happen on the initial carrier (e.g. a primary carrier in CA scenario). It needs to be understood that the measurement report is transmitted as a response to the measurement report request.

In an embodiment, the measurement report is not transmitted, by the terminal device 110, without receiving the measurement report request from network element 102. Consequently, the measurement report is not received, by the network element 102, without requesting the measurement report from the terminal device 110. The terminal device 110 may determine that the measurement report is to be transmitted only on request (i.e. when the measurement report request is received). The determination may be based on predetermined configuration and/or received configuration information from the network element 102 and/or some other network element of the radio system. By transmitting the measurement report only on request, the network load may be decreased. If the terminal device 110 would transmit the measurement report without the request, the network load may increase (e.g. especially if there are a lot of different devices), and/or the network element 102 may receive the measurement report in situations in which it does not necessarily require it.

The network element 102 may receive the measurement report, and perform operations based on the measurement report. As explained in FIG. 2, the network element 102 may determine whether the measurement report comprise indication of the one or more cell candidates. If not (i.e. the terminal device has not found any suitable candidates), the network element 102 may try to request, for example, another measurement report for some other carrier(s) and/or the same at least one further carrier. For example, if there are no cell candidates for licensed carriers, the network element 102 may try to allocate further radio resources on at least one unlicensed carrier. Such may require another measurement report from the terminal device 110, for example.

If the measurement report indicates one or more cell candidates for providing the radio resources to the terminal device 110 from the at least one further carrier, the network element 102 may configure further cell(s) of the one or more cell candidate(s) to the terminal device 110. This may require transmitting a control message to terminal device 110, wherein the control message may comprise indication of allocation of radio resources on the at least one further carrier to the terminal device 110. The terminal device 110 may receive the control message, and determine the allocated radio resources. The terminal device 110 may, for example, transmit and/or receive data using said allocated radio resources on the at least one further carrier. Thus, the configuring in step 408, may comprise allocating radio resources, provided by at least one cell among the one or more cell candidates, to the terminal device 110. For example, if there are three cell candidates indicated by the measurement report, the network element 102 may select one of the candidates to provide further radio resources to the terminal device form a secondary carrier (e.g. the initial carrier being a primary carrier). For example, said one cell may be a SCell or a PSCell.

FIG. 4B illustrates an embodiment of the invention. Referring to FIG. 4B, the network element 102 may transmit configuration information to the terminal device 110 (step 412). The terminal device 110 may receive the configuration information. In an embodiment, a second network element of the radio system transmits the configuration information to the terminal device 110.

The configuration information may be transmitted by the network element 102 to the terminal device 110 (e.g. dedicated signaling) and/or to a group of terminal devices (e.g. broadcast). The configuration information may determine at least one measurement for the terminal device 110 on the at least one further carrier. Thus, the network element 102 may configure the terminal device 110 to start performing measurement(s) to determine the one or more cell candidate(s). However, the configuration information transmitted in step 412 may not cause the terminal device to transmit the measurement report.

Using the configuration information (i.e. transmitting said configuration information to the terminal device 110), the network element 102 may configure the terminal device 110 to perform inter-frequency measurements. In an embodiment, the configuration information indicates to the terminal device 110 that the at least one measurement is for the determining the at least one cell among the one or more cell candidates for providing said radio resources from the at least one further carrier. The terminal device 110 may determine, based on the received configuration information that the at least one measurement, performed by the terminal device 110, is for determining the at least one cell among the determined one or more cell candidates for providing said radio resources from the at least one further carrier. When the method is used in CA scenario, this may mean that the configuration information indicates to the terminal device 110 that the at least one further carrier comprises and/or is at least one Component Carrier (CC), i.e. carrier(s) which are targeted to be used e.g. in connection with CA, and cells detected on the at least one further carrier are thus potential SCells and/or PSCells. The terminal device 110 may thus be configured, by the network element 102, to detect and/or measure cells so that if the terminal device 110 receives the measurement report request from the network element 102, it may respond with the measurement report without a need to perform further measurement(s) after receiving said request.

In step 414, the terminal device 110 may initiate the at least one measurement to determine the one or more cell candidate(s). In an embodiment, the transmitted configuration information causes performing of the at least one measurement by the terminal device 110. Thus, the terminal device 110 may perform the at least one measurement as a response to the receiving the configuration information (step 412).

In step 416, the terminal device 110 may determine the one or more cell candidate(s), which may comprise detecting and/or measuring cell candidate(s), as described above. The terminal device 110 may store the determined one or more cell candidate(s) into memory of the terminal device 110 (step 418). The determined one or more cell candidate(s) may be stored into memory such that they are associated with certain carrier(s). Thus, when the measurement report is requested, the terminal device 110 may generate the measurement report based on the stored information.

Further, in step 420, the terminal device 110 may continue to update measurements on the determined one or more cell candidates. For example, the configuration information may indicate to the terminal device 110 that the detected cell candidate(s) should be measured periodically. For example, the configuration information may indicate to the terminal device 110 that the at least one measurement on the at least one further carrier should be performed periodically. The network element 102 may also transmit further control information causing the terminal device 110 to stop the updating of step 420.

In an embodiment, the configuration information (transferred in step 412) indicates to the terminal device 110 that the measurement report is to be transmitted only on request. Thus, the measurement report is to be transmitted only when the measurement report request is received. The terminal device may determine, based on the configuration information that the measurement report is to be transmitted only on request from the network element 102 and/or some other network element.

Figure 4C:
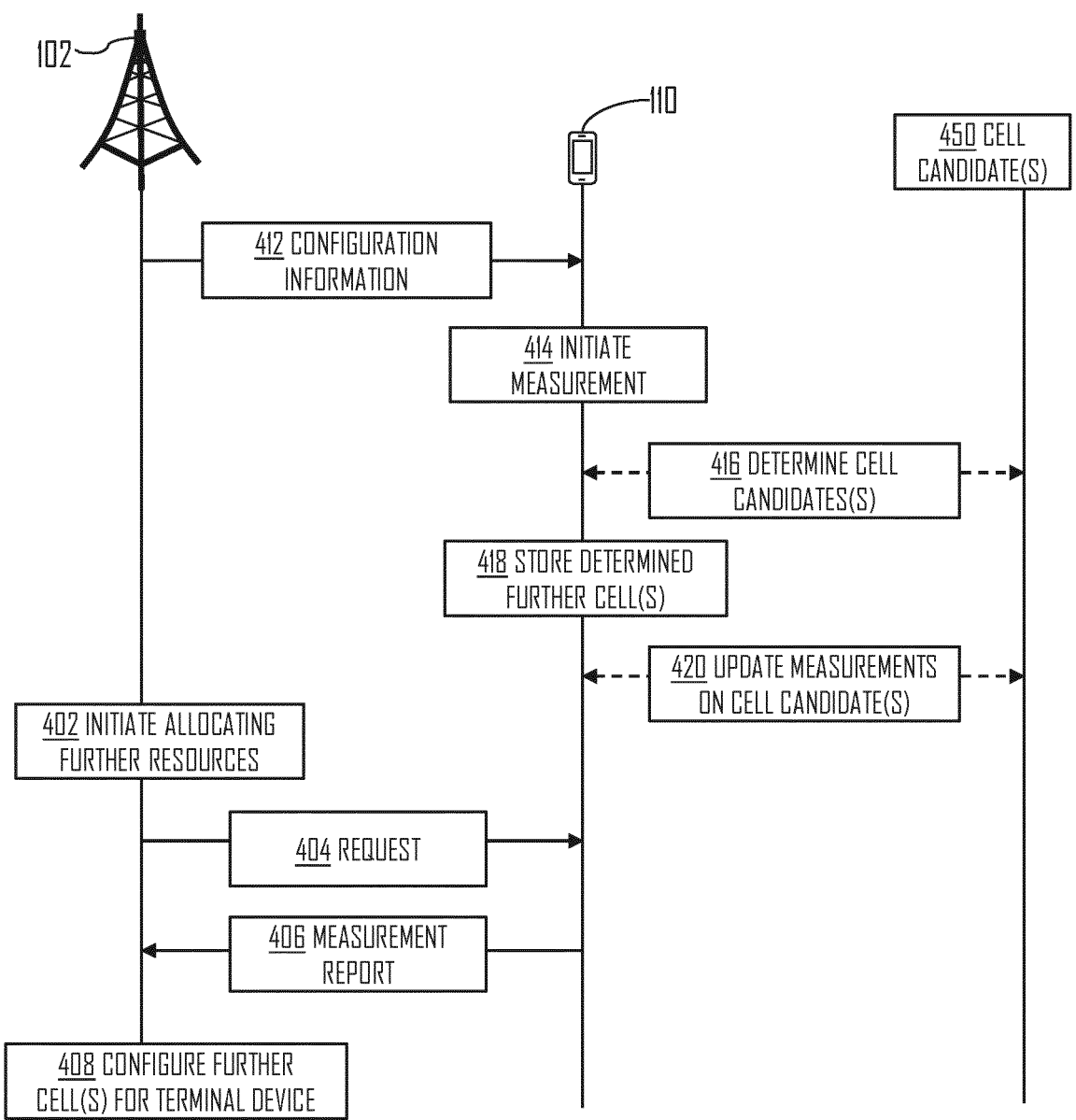

FIG. 4C illustrates an embodiment. In FIG. 4C, the procedure explained in relation to FIGS. 4A to 4B may be both shown. Referring to FIG. 4C, at some point the network element 102 may configure, by transmitting the configuration information (step 412), the terminal device 110 to initiate measurement(s) on one or more further carriers to determine one or more cell candidate(s) for the one or more further carrier (step 414). The configuration at step 412 may comprise an indication that the measurement report(s) are not to be sent, by the terminal device 110, until the measurement report request 404 is sent to the terminal device 110. The terminal device 110 may then perform determining cell candidate(s) 450 for the one or more carriers (step 416). The cell candidate(s) 450 may be cells which the terminal device 110 may be able to detect on the one or more further carrier(s), or that the detected cells fulfil the quality requirements (e.g. RSSI is stronger than a threshold value). The cell candidate(s) 450 may comprise, for example, PSCells, SCells, and/or unlicensed cells or (licensed) cells in unlicensed band. The cell candidate(s) may be provided by one or more network elements, such as the network element 102, or the local area access node 112 to name a few.

In step 418, the terminal device 110 may store determined cell candidate(s) (i.e. detected and/or measured cell(s) on the one or more further carriers) (step 418). In addition, in step 418, the information may be stored without sending the measurement report by the terminal device 110 to the network element 102. Further, the terminal device 110 may keep detecting the cell candidate(s) 450 on the one or more further carrier and/or keep updating the measurement(s) on the detected and/or determined cell candidate(s) (step 420). To further explain the situation, for example, the steps of FIG. 4B may be performed without performing the steps of FIG. 4A in the respective apparatuses (e.g. network element 102, terminal device 110). However, the steps of the method as shown in FIG. 4C, may also be linked together as the measurement report may be generated and/or stored based on information obtained in step 418.

At some point, the network element 102 may determine to allocate radio resources from one or more further carrier to the terminal device 110 (step 402). These one or more further carriers may be comprised in the one or more further carriers which the network element 102 has configured to start measurement(s) on by transmitting the configuration information in step 412. For example, the network element 102 may configure measurements on two carriers and determine to allocate radio resources from one or two carriers of the two carriers.

The network element 102 may thus transmit an activation command (also referred to as the measurement report request) to the terminal device 110 (step 404). In an embodiment, the network element 102 configures the terminal device 110 (step 412) before transmitting the measurement report request (step 404). Thus, the terminal device 100 may have the necessary information (i.e. cell candidates(s) for given carriers) for generating the measurement report, and transmitting the measurement report when it is requested. In an embodiment, the measurement report is generated, by the terminal device 110, before receiving the measurement report request. Thus, the terminal device 110 may instantly transmit the measurement report when it is requested.

The activation command (step 404) may relate to the carrier(s) from which the network element 102 has determined to allocate resources from. The terminal device 110 may receive the activation command, and respond with the measurement report (step 406). In an embodiment, the measurement report is generated by the terminal device 110 before receiving the request. For example, the terminal device 110 may generate the measurement report after performing the determination of the cell candidate(s) (step 416). However, the terminal device 110 may transmit the measurement report after receiving the activation command.

In step 408, the network element 102 may configure further cell(s) among the one or more cell candidate(s) of the measurement report for the terminal device 110. Thus, radio resources from the further carrier(s) may be allocated to the terminal device. Said configuring may comprise signaling to the provider(s) of the further cell(s) and/or to the terminal device 110. The radio communication network may configure the terminal device 110 to perform inter-frequency measurements on a carrier or carriers. The terminal device may not have configured measurement events and/or the terminal device may not send measurement reports e.g. triggered by cells on that carrier (or group of carriers). Instead the terminal device may be configured to detect and measure cells so that if the terminal device receives an activation command from, for example, an eNB of the radio communication network it may immediately respond with the report of 'best' cells on the carrier (or group of carriers). The 'best' cells on the carrier may comprise, for example, best three detected or measured cells on the carrier. The criterion to determine the 'best' cells may be, for example, highest RSSI, e.g. the higher RSSI of a cell may be regarded 'better' than lower RSSI. Similarly, other measurements such as SNR may be used for the determination.

The terminal device may perform measurements (e.g. monitor) on the carrier—i.e. detect and measure cells. The terminal device may potentially evaluate measured cells but this may not necessarily be needed. The terminal device may perform measurements which may be reported and/or sent back to radio communication network (e.g. to the eNB) when requested and/or needed by the radio communication network. If the terminal device receives an activation command from the radio communication network, as in FIG. 4C, the terminal device may reply to the activation command by sending a measurement report to the network as in FIG. 4C (i.e. measurement report which may mean 'report of cells from a certain measured carrier'. The measurement report sent to the radio communication network may contain none (if e.g. no cells are detected and/or no detected cells fulfilling configured thresholds), one or more detected and/or measured cells from the activated CC (measured carrier in this example). One alternative embodiment could be an explicit indication that nothing is found, or that the terminal device has not found a good enough cell (e.g. based on predefined quality threshold, or quality threshold explicitly indicated in the activation signaling from the eNB).

In case the terminal device is configured to measure multiple carriers without reporting (as a group), the terminal device may be requested to report e.g. best cell for each carrier when receiving the activation command. Alternatively the terminal device may report the best cell (or e.g. 3 best cells) among the group of carriers for which the activation is requested.

Based on the reported cells from the terminal device the radio communication network (e.g. an eNB of the radio communication network) may choose the most suitable cell(s) to be used as e.g. SCell. The radio communication network may then next configure the terminal device with the SCell configuration re-using existing configuration method—with the addition that the SCell may now already be activated upon configuration.

Benefits of this approach may be reduced signaling exchange between the terminal device and radio communication network while still keeping the network control and visibility. SCell configuration may be done based on up to date report from the terminal device upon activation.

Figure 5A:
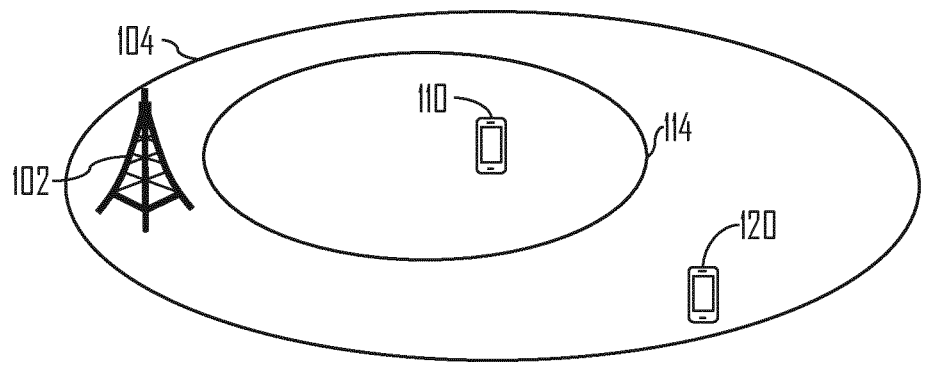
FIGS. 5A to 5B illustrate some embodiments.
Figure 5B:
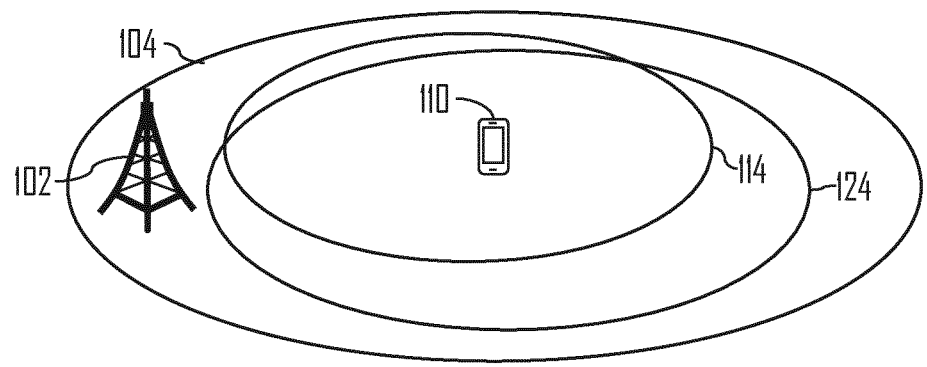

FIGS. 5A to 5B illustrate some embodiments. In the example of FIG. 5A, the terminal device 110 may determine that the cell 104 and/or the cell 114 may provide radio resources from at least one further carrier. However, this requires that the cell 104 and/or the cell 114 have capability to operate on the at least one further carrier. However, for the terminal device 120, only the cell 104 may provide the radio resources as the terminal device 120 is not in the coverage of the cell 114. For example, the cell 114 may be provided by a Secondary eNB (SeNB).

Referring to FIG. 5B, the terminal device 110 may be situated in a coverage of the cells 104, 114, 124. For example, the cell 114 may be provided by a SeNB and the cell 124 may be provided by a Primary Secondary eNB (PSeNB). The cell 104 may be provided by the network element 102. Therefore, the cells 104, 114, 124 may be possible cell candidates for providing radio resources from the at least one further carrier, provided that they support the at least one further carrier.

Figure 6A:
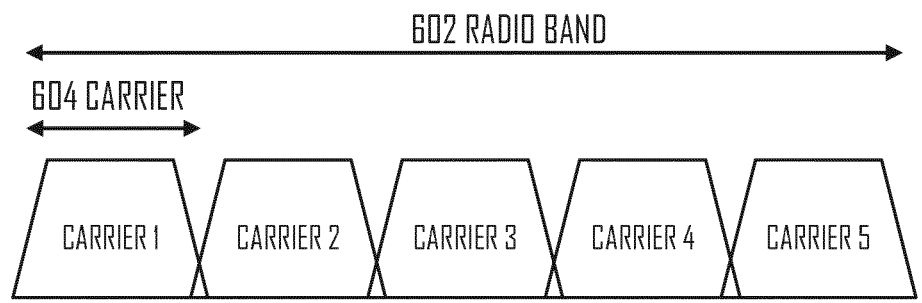
FIGS. 6A to 6B illustrate some embodiments.
Figure 6B:
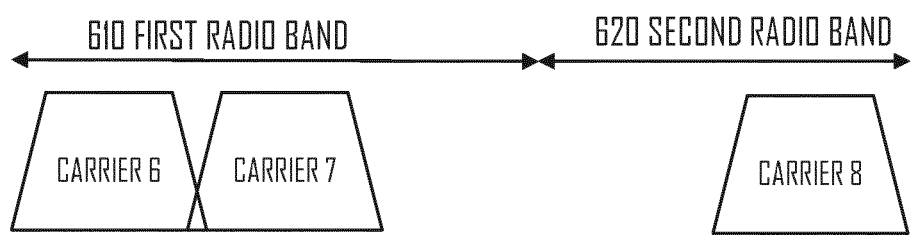

FIGS. 6A to 6B illustrate some embodiments. Referring to FIGS. 6A to 6B, the at least one further carrier may comprise a plurality of carriers. For example in FIG. 6A, five different carriers 604 are shown. These carriers 604 may extend over a radio band 602. For example, in LTE-A one carrier may be 20 MHz, and thus the radio band 602 may be 100 MHz in total. It needs to be understood that the number of carriers may differ between different radio systems configurations.

In an example in relation to FIG. 6A, the network element 102 may first allocate resources from the carrier 1 to the terminal device 110. The network element 102 may transmit configuration information to terminal device 110, wherein the configuration information causes the terminal device 110 to perform the at least one measurement on carriers 2 to 5. The network element 102 may in some point determine that further radio resources from at least one further carrier (e.g. at least one of the carriers 2 to 5) are needed for the terminal device 110. Thus, the network element 102 may request the measurement report in relation to at least one of the carriers 2 to 5. Based on the measurement report, the network element 102 may allocate radio resources from at least one of the carriers 2 to 5 to the terminal device 110.

Referring to FIG. 6B, the at least one further carrier may comprise carriers from different radio bands. Thus, for example, inter-band non-contiguous CA may be supported. For example, initially the network element 102 may allocate radio resources to the terminal device 110 from carrier 6 and/or 7, for example. The network element 102 may then determine to allocate further radio resources to the terminal device 110 from carrier 8. Therefore, it may request the measurement report related to the carrier 8, and based on said measurement report, allocate radio resources to the terminal device from the carrier 8.

In an embodiment, the configuration information determines the at least one measurement to be performed by the terminal device 110 on each of the plurality of carriers. Thus, for example, if the at least one further carrier comprises carriers 2 to 5 of FIG. 6A, the terminal device 110 may perform the at least one measurement on each of the carriers 2 to 5. The configuration information, transmitted to the terminal device 110, may comprise indication about the carriers on which the at least one measurement should be performed. In an embodiment, the terminal device 110 performs, based on the configuration information received from the network element 102, the at least one measurement on each of the plurality of carriers. Thus, the terminal device 110 may determine the one or more cell candidate(s) for each carrier indicated by the configuration information, for example.

Figure 7A:
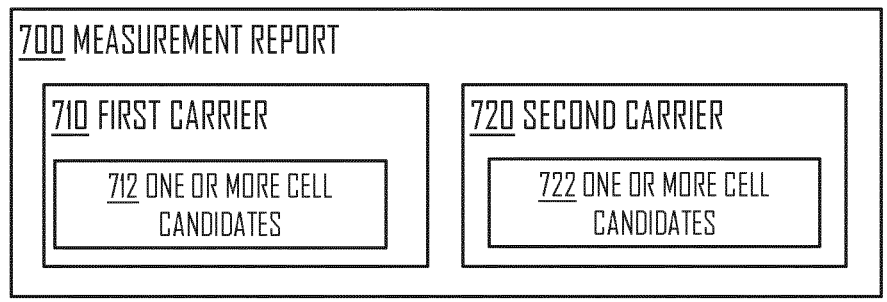
FIGS. 7A to 7B illustrate some embodiments.
Figure 7B:
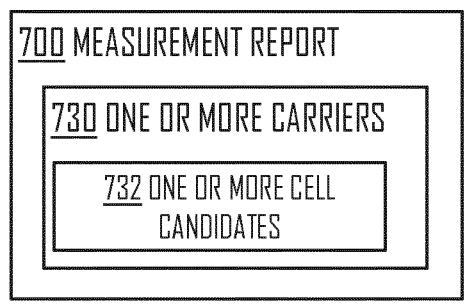

FIGS. 7A to 7B illustrate the measurement report according to some embodiments. Referring to FIG. 7A, the measurement report may be requested, by the network element 102, to indicate the one or more cell candidates for each of the plurality of carriers. 19. The terminal device may generate the measurement report 700 such that it indicates the determined one or more cell candidates for each of the plurality of carriers. Thus, for example, the measurement report 700 may comprise a portion for the plurality of carriers 710, 720. Each portion 710, 720 may comprise indication of one or more cell candidate(s) 712, 722 for respective carrier. For example, the measurement report 700 may be requested to indicate the determined one or more cell candidates for a first carrier 710 and a second carrier 720. Thus, the measurement report 700 may comprise the determined one or more cell candidate(s) 712 related to the first carrier 710, and the determined one or more cell candidate(s) 722 related to the second carrier 720.

Referring to FIG. 7B, the measurement report 700 may be requested to indicate the one or more cell candidates 732 for an entity 730 formed by the plurality of carriers. Therefore, the terminal device 110 may generate the measurement report 700 such that it indicates the determined one or more cell candidates 732 for the entity 730 formed by the plurality of carriers. For example, if the plurality of carriers comprises three carriers, the measurement report may indicate the one or more cell candidates 732 for the three carriers.

Although some of the embodiments above are described in relation to CA, the method may be used also, for example, to change a more suitable carrier for the terminal device 110 by the network element 102. For example, the network element 102 may be in communication with the terminal device 102 on a first carrier. The network element 102 may configure the at least one measurement on a second carrier for the terminal device 110. The network element 102 may then decide to request the measurement report in relation to the second carrier. Based on the measurement report, the network element 102 may determine to allocate radio resources from the second carrier to the terminal device 110. Thus, the method may also be used in relation to a single carrier-based data transfer.

Benefits of the provided solution may be reduced signaling exchange between terminal device and the network (e.g. network element 102) while maintaining network control and visibility. As the number of devices increases in future network (e.g. 5G), it may be beneficial for the operation of the network to provide solutions which decrease the amount of signaling between the terminal devices and the network.

Figure 8:
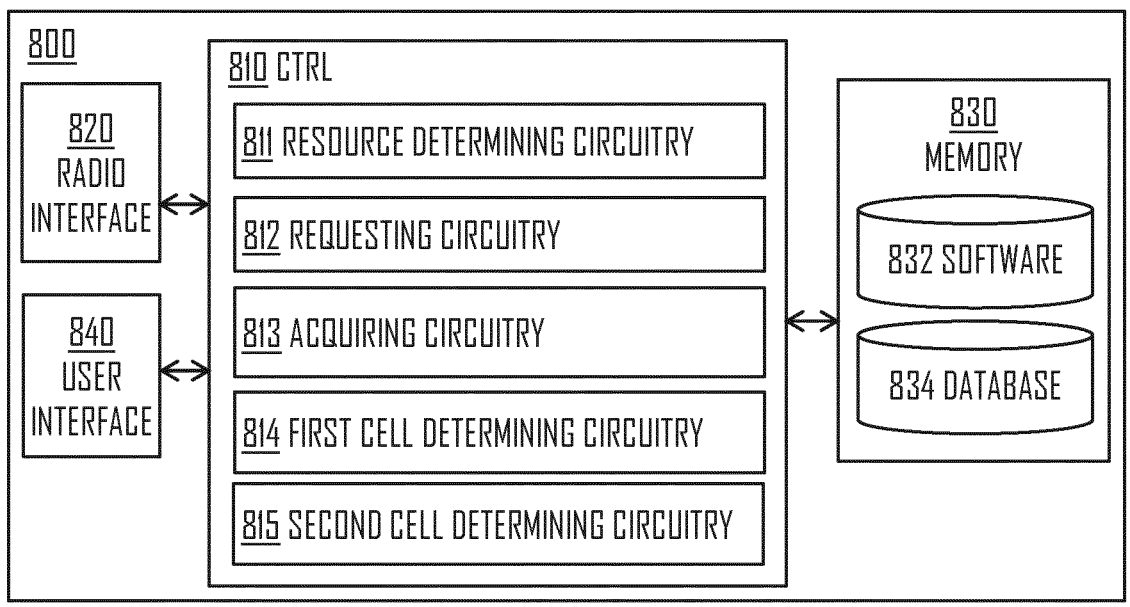
FIGS. 8 to 9 illustrate block diagrams of apparatuses according to some embodiments.
Figure 9:
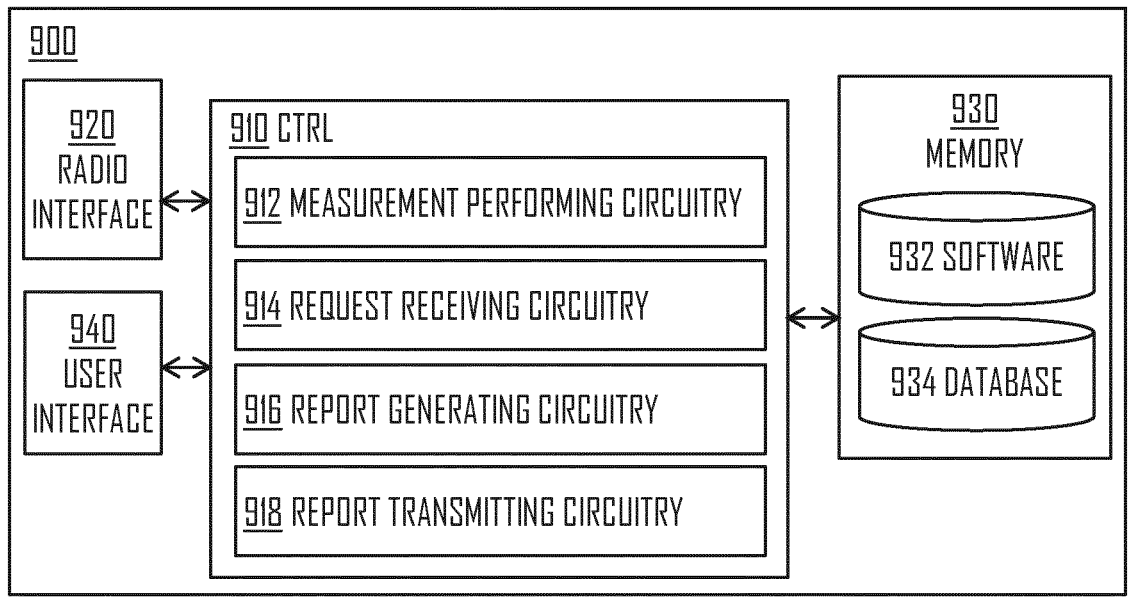

FIGS. 8 to 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 1 to 7B, or operations thereof.

Referring to FIGS. 8 to 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data.

The apparatuses 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable communication between the terminal device 110 and the network element 102. Further, the TRX may provide access to X2-interface by the network element 102, for example.

The apparatuses 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900. For example, a network element may be configured using the user interface 840 comprised in said network element. Naturally, a terminal device may comprise a user interface.

In an embodiment, the apparatus 800 may be or be comprised in a base station (also called a base transceiver station, a Node B, a radio network controller, or an evolved Node B, for example). The apparatus 800 may be the network element 102, for example. Further, the apparatus 800 may be the network element performing the steps of FIG. 2. In an embodiment, the apparatus 800 is comprised in the network element 102.

Referring to FIG. 8, the control circuitry 810 may comprise a resource determining circuitry 811 configured to determine to initiate allocation of radio resources to a terminal device from at least one further carrier; a requesting circuitry 812 configured to request from the terminal device, as a response to the determining, a measurement report for determining at least one cell for providing said radio resources to the terminal device from the at least one further carrier; an acquiring circuitry 813 configured to acquire, as response to the requesting, the measurement report from the terminal device; a first cell determining circuitry 814 configured to determine whether the measurement report indicates one or more cell candidates for providing said radio resources to the terminal device from the at least one further carrier; and a second determining circuitry 815 configured to determine, as a response to the determining that the measurement report indicates the one or more cell candidates, the at least one cell among the one or more cell candidates for providing said radio resources to the terminal device from the at least one further carrier.

In an embodiment, the apparatus 900 may be or be comprised in a terminal device, such as a mobile phone or cellular phone, for example. The apparatus 900 may be the at least one terminal device 110, 120, 130, 140, for example. In an embodiment, the apparatus 900 is the terminal device performing the steps of FIG. 3. In an embodiment, the apparatus 900 is comprised in the at least one terminal device 110, 120, 130, 140.

Referring to FIG. 9, the control circuitry 910 may comprise a measurement performing circuitry 912 configured to perform at least one measurement on at least one further carrier to determine one or more cell candidates for providing radio resources to a terminal device from the at least one further carrier; a request receiving circuitry 914 configured to receive a measurement report request from the network element; a report generating circuitry 916 configured to generate the measurement report such that it comprises indication of determined one or more cell candidates for providing said radio resources from the at least one further carrier; and a report transmitting circuitry 918 configured to transmit the measurement report to the network element as a response to the measurement report request.

In an embodiment, the report generating circuitry 916 is configured to generate the measurement report as a response to the measurement report request. However, it may be possible that the measurement report is generated before receiving the measurement report request. The measurement report may be transmitted, by the report transmitting circuitry 918, for example, using the TRX as a response to said request.

Figure 10:
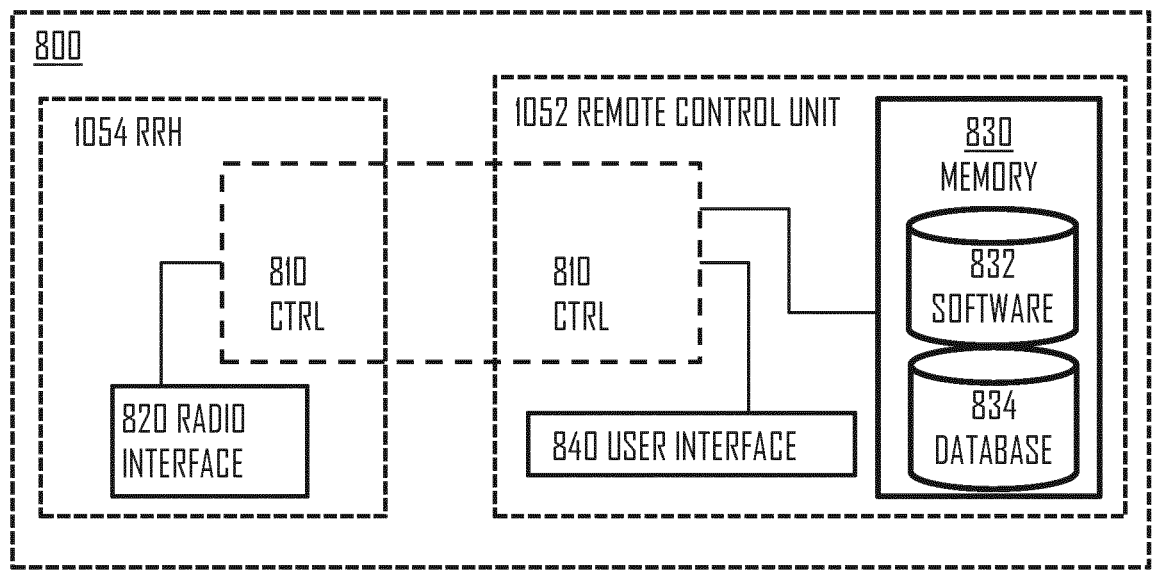
FIG. 10 illustrates an embodiment.

In an embodiment, as shown in FIG. 10, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 utilizing such shared architecture (e.g. as shown in FIG. 10), may comprise a remote control unit (RCU) 1052, such as a host computer or a server computer, operatively coupled (e.g. via a wireless or wired network) to a remote radio head (RRH) 1054 located in the base station. In an embodiment, at least some of the described processes may be performed by the RCU 1052. In an embodiment, the execution of at least some of the described processes may be shared among the RRH 1054 and the RCU 1052.

In an embodiment, the RCU 1052 may generate a virtual network through which the RCU 1052 communicates with the RRH 1054. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
transmitting, by a network element on a carrier to a terminal device, configuration information wherein the configuration information is configured to allow the terminal device to determine at least one measurement for the terminal device on at least one further carrier so that the terminal device is able to respond to an activation command regarding the at least one further carrier;
determining, by the network element, to initiate allocation of radio resources to the terminal device from the at least one further carrier;
as a response to the determining, transmitting the activation command to the terminal device, the activation command being configured to activate the at least one further carrier and request, from the terminal device, a measurement report regarding the activated at least one further carrier for determining at least one cell for providing said radio resources to the terminal device from the at least one further carrier;
wherein the measurement report request comprises a quality threshold for determining one or more cell candidates for providing said radio resources to the terminal device from the at least one further carrier;
as a response to the transmitting of the activation command, acquiring the measurement report from the terminal device;
determining whether the measurement report indicates the one or more cell candidates for providing said radio resources to the terminal device from the at least one further carrier; and
as a response to the determining that the measurement report indicates the one or more cell candidates, determining, by the network element, the at least one cell among the one or more cell candidates for providing said radio resources to the terminal device from the at least one further carrier.

2. The method of claim 1, wherein the configuration information further indicates to the terminal device that the at least one measurement is for the determining the at least one cell among the one or more cell candidates for providing said radio resources from the at least one further carrier.

3. The method of claim 1, wherein the transmitted configuration information is configured to cause performing of the at least one measurement by the terminal device.

4. The method of claim 1, wherein the measurement report is not received without requesting the measurement report from the terminal device.

5. The method of claim 1, wherein the configuration information is configured to indicate to the terminal device that the measurement report is to be transmitted only in response to the activation command.

6. The method of claim 1, wherein the at least one further carrier comprises a plurality of carriers, and wherein the transmitted configuration information determines the at least one measurement to be performed by the terminal device on each of the plurality of carriers.

7. The method of claim 1, wherein the at least one further carrier comprises a plurality of carriers, and wherein the measurement report is requested to indicate the one or more cell candidates for each of the plurality of carriers.

8. The method of claim 1, wherein the at least one further carrier comprises a plurality of carriers, and wherein the measurement report is requested to indicate the one or more cell candidates for an entity formed by the plurality of carriers.

9. A method comprising:
receiving, by a terminal device on a carrier from a network element, configuration information, wherein the terminal device determines at least one measurement on at least one further carrier based on the configuration information so that the terminal device is able to respond to an activation command regarding the at least one further carrier;
performing the at least one measurement on the at least one further carrier to determine, by the terminal device, one or more cell candidates for providing radio resources to the terminal device from the at least one further carrier;
receiving the activation command from the network element, where the activation command is configured to cause activation of the at least one further carrier and request, from the terminal device, a measurement report regarding the activated of the at least one further carrier;
wherein the measurement report request comprises a quality threshold for determining the one or more cell candidates for providing said radio resources to the terminal device from the at least one further carrier;
generating, based on the performed at least one measurement on the at least one further carrier, the measurement report such that the measurement report comprises indication of determined one or more cell candidates for providing said radio resources from the at least one further carrier; and
transmitting the measurement report to the network element as a response to the measurement report request.

10. The method of claim 9, further comprising:
before receiving the measurement report request, receiving configuration information by the terminal device from the network element, wherein the terminal device determines the at least one measurement on the at least one further carrier based on the configuration information.

11. The method of claim 10, wherein the terminal device determines, based on the configuration information, that the at least one measurement is for determining, by the network element, at least one cell among the determined one or more cell candidates for providing said radio resources from the at least one further carrier.

12. The method of claim 9, wherein the terminal device determines that the measurement report is to be transmitted to the network element only on receipt of the measurement report request from the network element.

13. The method of claim 12, wherein determining that the measurement report is to be transmitted only on receipt of the measurement report request from the network element is based on the configuration information.

14. The method of claim 9, wherein the at least one further carrier comprises a plurality of carriers, and wherein the terminal device performs, based on the configuration information, the at least one measurement on each of the plurality of carriers.

15. The method of claim 9, wherein the at least one further carrier comprises a plurality of carriers, and wherein the terminal device generates the measurement report such that the measurement report indicates the determined one or more cell candidates for each of the plurality of carriers.

16. The method of claim 9, wherein the at least one further carrier comprises a plurality of carriers, and wherein the terminal device generates the measurement report such that the measurement report indicates the determined one or more cell candidates for the entity formed by the plurality of carriers.

17. The method of claim 9, wherein the determining of the one or more cell candidates for providing radio resources to the terminal device from the at least one further carrier is based on both the one or more cell candidates fulfilling the quality threshold, and on the terminal device being within a coverage area of the one or more cell candidates.

18. A method comprising:
transmitting configuration information by a network element on a carrier to a terminal device, wherein the configuration information is configured to allow the terminal device to determine at least one measurement for the terminal device on at least one further carrier and subsequently transmit a measurement report regarding the at least one measurement, and based upon the configuration information, by the terminal device on request by the network element;

determining, by the network element, to initiate allocation of radio resources to the terminal device from the at least one further carrier;

as a response to the determining, requesting, from the terminal device, the measurement report regarding the at least one measurement for determining at least one cell for providing said radio resources to the terminal device from the at least one further carrier;

wherein the measurement report request comprises a quality threshold for determining one or more cell candidates for providing said radio resources to the terminal device from the at least one further carrier;

as a response to the requesting, acquiring the measurement report from the terminal device;

determining whether the measurement report indicates the one or more cell candidates for providing said radio resources to the terminal device from the at least one further carrier; and as a response to the determining that the measurement report indicates the one or more cell candidates, determining, by the network element, the at least one cell among the one or more cell candidates for providing said radio resources to the terminal device from the at least one further carrier.

19. The method of claim 18, wherein the configuration information further indicates to the terminal device that the at least one measurement is for the determining the at least one cell among the one or more cell candidates for providing said radio resources from the at least one further carrier.

20. The method of claim 18, wherein the transmitted configuration information is configured to cause performing of the at least one measurement by the terminal device.

21. The method of claim 18, wherein the measurement report is not received without requesting the measurement report from the terminal device.

* * * * *